(12) United States Patent
Nakaya

(10) Patent No.: US 11,338,386 B2
(45) Date of Patent: May 24, 2022

(54) FRICTION WELDING METHOD AND MACHINE TOOL

(71) Applicants: CITIZEN WATCH CO., LTD., Nishitokyo (JP); CITIZEN MACHINERY CO., LTD., Kitasaku-gun (JP)

(72) Inventor: Takaichi Nakaya, Higashimurayama (JP)

(73) Assignees: CITIZEN WATCH CO., LTD., Nishitokyo (JP); CITIZEN MACHINERY CO., LTD., Kitasaku-gun (JP)

(*) Notice: Subject to any disclaimer, the term of this patent is extended or adjusted under 35 U.S.C. 154(b) by 0 days.

(21) Appl. No.: 16/762,502

(22) PCT Filed: Oct. 31, 2018

(86) PCT No.: PCT/JP2018/040520
§ 371 (c)(1),
(2) Date: May 8, 2020

(87) PCT Pub. No.: WO2019/102808
PCT Pub. Date: May 31, 2019

(65) Prior Publication Data
US 2021/0129262 A1  May 6, 2021

(30) Foreign Application Priority Data
Nov. 27, 2017 (JP) .............................. JP2017-227236

(51) Int. Cl.
*B23K 20/12* (2006.01)
*B29C 65/06* (2006.01)

(52) U.S. Cl.
CPC ............ *B23K 20/123* (2013.01); *B29C 65/06* (2013.01)

(58) Field of Classification Search
CPC .. B23K 20/123; B23K 20/12; B23K 20/1205; B23K 20/121; B23K 20/122;
(Continued)

(56) References Cited

U.S. PATENT DOCUMENTS

| 3,712,528 A * | 1/1973 | Takagi | B23K 20/121 |
| | | | 228/2.3 |
| 3,725,998 A * | 4/1973 | Searle | B23K 20/1205 |
| | | | 228/114.5 |
| 2017/0246707 A1* | 8/2017 | Bray | B23K 20/1225 |

FOREIGN PATENT DOCUMENTS

| CN | 101961816 A | 2/2011 |
| DE | 102010034393 A1 | 2/2012 |

(Continued)

OTHER PUBLICATIONS

Jan. 22, 2019, International Search Report issued in the International Patent Application No. PCT/JP2018/040520.

(Continued)

*Primary Examiner* — Francisco W Tschen
*Assistant Examiner* — Abhishek A Patwardhan
(74) *Attorney, Agent, or Firm* — Kenja IP Law PC

(57) ABSTRACT

Disclosed is a friction welding method including: a heating step wherein, in relation to joining surfaces (S1, S2) defined by opposite end surfaces of a pair of materials (W1, W2), the pair of materials (W1, W2) are moved from a state in which their axes are unaligned with each other, in a direction for aligning the respective axes with each other, to a prescribed position where the joining surfaces (S1, S2) are brought into contact with each other and friction heated; and a pressure contacting step wherein the pair of materials are brought into pressure contact with each other. The method is characterized in that the heating step and the pressure contacting step are carried out while rotating each of the materials (W1, W2) at the same rotation speed in the same direction, as seen from one side in the axial direction.

8 Claims, 8 Drawing Sheets

(58) Field of Classification Search
CPC ............ B23K 20/1215; B23K 20/1225; B23K 20/1245; B23K 20/125; B23K 20/1255; B23K 20/1285; B23K 20/129; B23K 20/1295; B29C 65/00; B29C 65/02; B29C 65/06; B29C 65/0609; B29C 65/0618; B29C 65/0627; B29C 65/0636; B29C 65/0645; B29C 65/0654; B29C 65/0663; B29C 65/0672; B29C 65/0681; B29C 65/069

See application file for complete search history.

(56) References Cited

FOREIGN PATENT DOCUMENTS

| EP | 3238868 A1 | 11/2017 |
|---|---|---|
| JP | S4828265 B | 8/1973 |
| JP | S4928339 B | 7/1974 |
| JP | S5519560 A | 2/1980 |
| JP | H06312279 A | 11/1994 |

OTHER PUBLICATIONS

Jun. 2, 2020, International Preliminary Report on Patentability issued in the International Patent Application No. PCT/JP2018/040520.

Jun. 21, 2021, Office Action issued by the China National Intellectual Property Administration in the corresponding Chinese Patent Application No. 201880072767.1.

Aug. 5, 2021, the Extended European Search Report issued by the European Patent Office in the corresponding European Patent Application No. 18880241.7.

Mar. 3, 2022, Office Action issued by the Taiwan Intellectual Property Office in the corresponding Taiwanese Patent Application No. 107139419.

Feb. 17, 2022, Office Action issued by the China National Intellectual Property Administration in the corresponding Chinese Patent Application No. 201880072767.1.

* cited by examiner

Pressure joining

Pressure joining

FRICTION WELDING METHOD AND MACHINE TOOL

TECHNICAL FIELD

This disclosure relates to a friction welding method and a machine tool.

BACKGROUND

In the state of the art, there is known a method for friction welding a pair of materials using a machine tool, such as a lathe including a pair of spindles arranged opposite to each other. In this method, a pair of materials held by the pair of spindles are rotated in mutually opposite directions as seen from one side in the axial direction, and moved from a state where their axes are displaced until they are aligned and their joining surfaces are brought into contact with each other for friction heating and, the pair of materials after alignment of their axes are brought into pressure contact with each other (refer, for example, to JPH 6-312279 A1 (PTL 1)).

CITATION LIST

Patent Literature

PTL 1: JPH 6-312279 A1

SUMMARY

Technical Problem

In the conventional friction welding method as disclosed in PTL 1, friction heating is carried out by rotating the pair of materials in mutually opposite directions as seen from one side in the axial direction. It is therefore necessary to carry out the pressure contacting after stopping the rotation of each material, and it may not be easy to maintain each material in a state allowing the friction welding to be carried out, in the step of stopping each spindle for stopping the rotation of each material.

In view of the problems noted above, it would be helpful to provide a friction welding method and a machine tool, whereby the friction welding of the materials can be carried out while rotating each material.

Solution to Problem

According to the present disclosure, there is provided a friction welding method, comprising: a heating step wherein, in relation to joining surfaces defined by opposite end surfaces of a pair of materials that are held by a respective pair of opposite spindles, the pair of materials are moved from a state in which their axes are unaligned with each other, in a direction for aligning the respective axes with each other, to a prescribed position where the joining surfaces are brought into contact with each other and friction heated, and a pressure contacting step wherein the pair of materials are brought into pressure contact with each other at the prescribed position, characterized in that the heating step and the pressure contacting step are carried out while rotating each of the materials at the same rotation speed in the same direction, as seen from one side in the axial direction.

In the friction welding method according to the present disclosure, with the configuration as described above, it is preferred that the pressure contacting step is carried out at a position where the axes of the pair of the materials are aligned with each other.

It is preferred that the friction welding method according to the present disclosure, with the configuration as described above, further comprises a cutting step carried out after the pressure joining step, for cutting the materials while being rotated at the same rotation speed and in the same direction as in the heating step and the pressure contacting step, as seen from one side in the axial direction.

According to the present disclosure, there is further provided a machine tool comprising a pair of spindles arranged opposite to each other, and a control unit for controlling the movement and rotation of the spindles and carrying out a heating step wherein, in relation to joining surfaces defined by opposite end surfaces of a pair of materials that are held by a respective pair of opposite spindles, the pair of materials are moved from a state in which their axes are unaligned with each other, in a direction for aligning the respective axes with each other, to a prescribed position where the joining surfaces are brought into contact with each other and friction heated; and a pressure contacting step wherein the pair of materials are brought into pressure contact with each other at the prescribed position, characterized in that, under the control by means of the control unit, the heating step and the pressure contacting step are carried out while rotating the spindles at the same rotation speed in the same direction, as seen from one side in the axial direction.

In the machine tool according to the present disclosure, with the configuration as described above, it is preferred that, under the control by means of the control unit, the pressure contacting step is carried out at a position where the axes of the pair of materials are aligned with each other.

The machine tool according to the present disclosure, with the configuration as described above, may further comprise a tool, of which the movement is controlled by the control unit, wherein, under the control by means of the control unit, a cutting step is carried out after the pressure joining step, for cutting the materials by the tool while the spindles are rotated at the same rotation speed and in the same direction as in the heating step and the pressure contacting step, as seen from one side in the axial direction.

Advantageous Effect

The present disclosure thus provides a friction welding method and a machine tool adapted to carry out the heating step and the pressure contacting step while rotating each material, and easily maintain each material in a state where friction welding can be performed.

DETAILED DESCRIPTION

Figure 1:
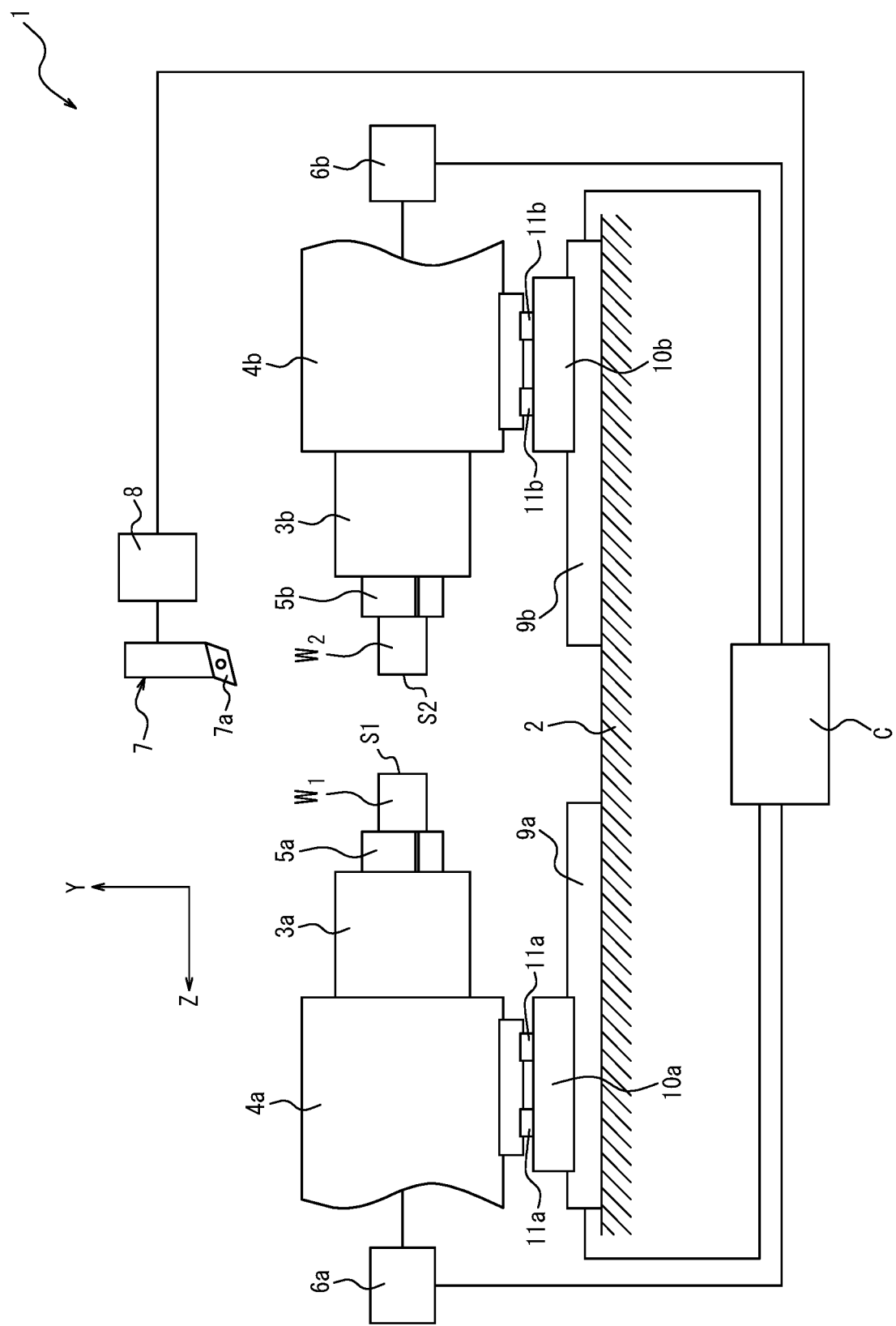
FIG. 1 is an explanatory view schematically illustrating the machine tool for carrying out the friction welding method according to one embodiment of the present disclosure.

The machine tool 1 illustrated in FIG. 1 has a pair of spindles arranged on a base 2, i.e., a first spindle 3a and a second spindle 3b. The first spindle 3a is rotatably supported by a first headstock 4a, and the second spindle 3b is rotatably supported by a second headstock 4b. The first spindle 3a and the second spindle 3b are arranged opposite to each other at a predetermined interval.

The first spindle 3a includes a first chuck 5a at the tip so that a first workpiece $W_1$ can be gripped by the first chuck 5a. Similarly, the second spindle 3b includes a second chuck 5b at the tip so that a second workpiece $W_2$ can be gripped by the second chuck 5b.

The first spindle 3a is driven for rotation by a first drive source 6a, and the second spindle 3b is rotationally driven by a second drive source 6b. As the first drive source 6a and the second drive source 6b, for example, there may be used an electric motor. By rotating the first spindle 3a with the first drive source 6a, the first workpiece $W_1$ held by the first spindle 3a can be rotated. Similarly, by rotating the second spindle 3b with the second drive source 6b, the second workpiece $W_2$ held by the second spindle 3b can be rotated.

The first headstock 4a is mounted on the base 2 via a first Z-axis guide rail 9a extending in the axial direction (Z-axis direction) of the first spindle 3a, a first saddle 10a slidably mounted on the first Z-axis guide rail 9a, and a first saddle 10a and a first X-axis guide rail 11a supported by the saddle 10a to extend in a horizontal direction (X-axis direction) perpendicular to the axial direction of the first spindle 3a. The first spindle 3a is driven for movement in the Z-axis direction and the X-axis direction together with the first headstock 4a, via ball screws or the like arranged between the first saddle 10a and the base 2 and also between the first saddle 10a and the first headstock 4a, by means of a motor or the like for rotating the ball screws.

The second headstock 4b is mounted on the base 2 via a second Z-axis guide rail 9b extending in the axial direction (Z-axis direction) of the second spindle 3b, a second saddle 10b slidably mounted on the second Z-axis guide rail 9b, and a second X-axis guide rail 11b supported by the saddle 10b to extend in a horizontal direction (X-axis direction) perpendicular to the axial direction of the second spindle 3b. The second spindle 3b is driven for movement in the Z-axis direction and the X-axis direction together with the second headstock 4b, via ball screws arranged between the second saddle 10b and the base 2 and also between the second saddle 10b and the second headstock 4b, by means of a motor or the like for rotating the ball screws.

In the embodiment illustrated herein, both the first spindle 3a and the second spindle 3b are driven for movement in the Z-axis direction and the X-axis direction. However, for example, only one of the first spindle 3a and the second spindle 3b may be configured to be driven for movement in the Z-axis direction and the X-axis direction. It is sufficient for the first spindle 3a and the second spindle 3b to be relatively movable in the Z-axis direction and the X-axis direction.

The machine tool 1 includes a cutting tool 7. The cutting tool 7 is mounted on the moving means 8 and is configured to be movable by moving means 8. The first workpiece $W_1$ and the second workpiece $W_2$ is subjected to cutting step by urging the blade portion 7a of the cutting tool 7 against the first workpiece $W_1$ and the second workpiece $W_2$ in a state where the first workpiece $W_1$ and the second workpiece $W_2$ are rotated together with the first spindle 3a and the second spindle 3b at a predetermined rotation speed (revolution speed) corresponding to the cutting step. The cutting tool 7 may be separately provided for the processing of the first workpiece $W_1$ on the first spindle 3a, and for the processing of the second workpiece $W_2$ on the second spindle 3b.

In case where both the first spindle 3a and the second spindle 3b are configured to be driven for movement in the Z-axis direction and the X-axis direction, instead of providing the moving means 8, the cutting tool 7 may be fixedly mounted on the tool rest such that, by relatively moving the spindle 3a and the second spindle 3b with respect to the cutting tool 7, the blade 7a of the cutting tool 7 is pressed against the joining workpiece W3 for carrying out the cutting step.

The machine tool 1 includes a control unit C. The control unit C may be comprised of a microcomputer including a CPU (central processing unit) and storage means, such as a memory. The control unit C is connected to the first drive source 6a, the second drive source 6b, the moving means 8, the Z-axis and X-axis slide moving mechanisms for the two headstocks 4a, 4b, and the like, and may serve to integrally control such operations as the rotation of the two spindles 3a, 3b. the movement of the cutting tool 7, and the movement of the two headstocks 4a and 4b. The machine tool 1 may be comprised of a lathe, such as a CNC lathe, for example.

The first workpiece $W_1$ and the second workpiece $W_2$ may, for example, be comprised of metal bars or the like with circular cross-section and end faces facing in the axial direction, i.e., the first joining surface S1 and the second joining surface S2 each having a flat surface perpendicular to the axial direction. The first workpiece $W_1$ may be an elongate round bar inserted from the rear end of the first spindle 3a, and the second workpiece $W_2$ may be the portion of the first workpiece $W_1$ that has been cut and processed on the first spindle 3a and remaining as the residual material.

In the state illustrated in FIG. 1 in which the first workpiece W1 is gripped by the first spindle 3a and the second workpiece W2 is gripped by the second spindle 3b, as illustrated in FIG. 1, when the first spindle 3a and the second spindle 3b are relatively moved along the Z axis and the X axis, the first workpiece $W_1$ and the second workpiece $W_2$ are moved such that the Z-axis direction positions of the first joining surface S1 and the second joining surface S2 coincide with each other and the first joint surface S1 and the second joint surface S2 are arranged such that their axes are unaligned in the X-axis direction and separated from each other in the X-axis direction.

Figure 2A:
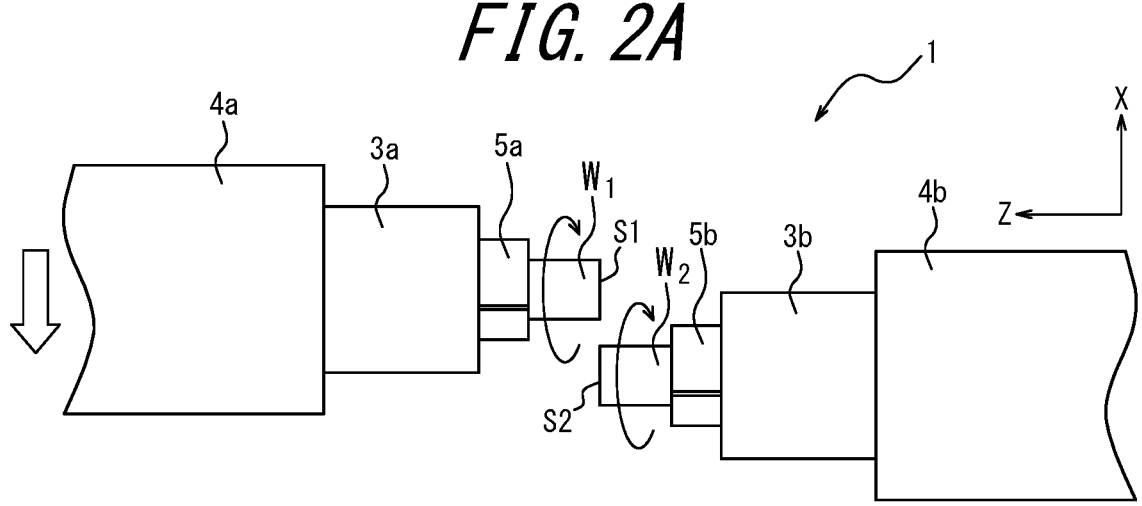
FIGS. 2A to 2C are explanatory views each illustrating the state in which the heating step is being carried out.
Figure 2B:
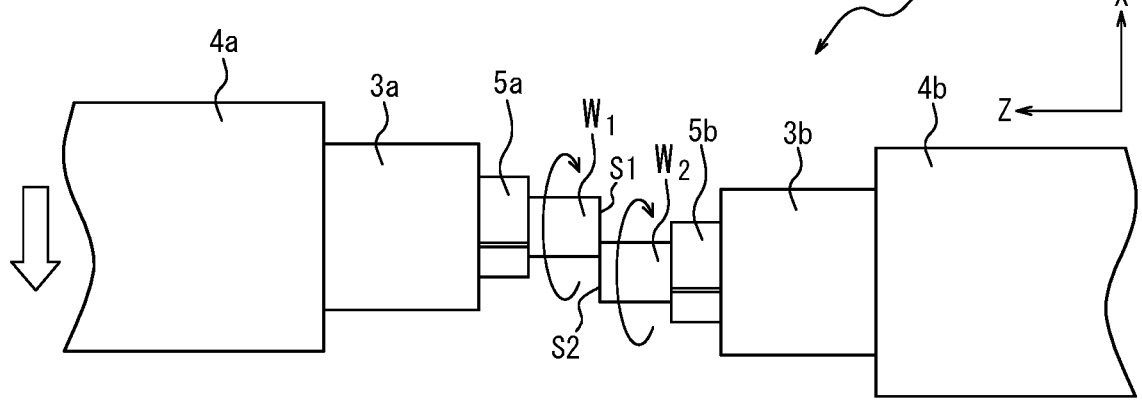
Figure 2C:
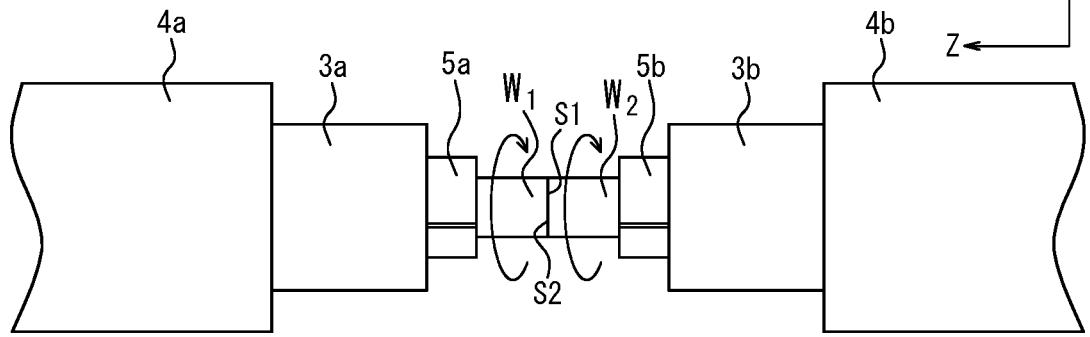

Due to the operation of the first spindle 3a and the second spindle 3b, in the state in which the first workpiece $W_1$ and the second workpiece $W_2$ are rotated at the same rotation speed in the same direction as seen from one side in the axial direction, the first workpiece $W_1$ is moved from the state illustrated in FIG. 2A, in the X-axis direction relative to the second workpiece $W_2$, such that the first joint surface S1 and the second joint surface S2 rotating at the same rotation speed and in the same direction are brought into contact with each other to carry out friction heating (heating step). The heating step is continued until the first workpiece $W_1$ and the second workpiece $W_2$ are moved from the state in which the axes are unaligned as illustrated in FIG. 2B, to the state in which the axes are aligned as illustrated in FIG. 2C. Upon movement of the first workpiece $W_1$ in the X-axis direction relative to the second workpiece $W_2$, the first workpiece $W_1$ and the second workpiece $W_2$ can be brought into contact with each other while being pressed against each other as necessary.

Figures 3A, 3B, 3C, 3D:
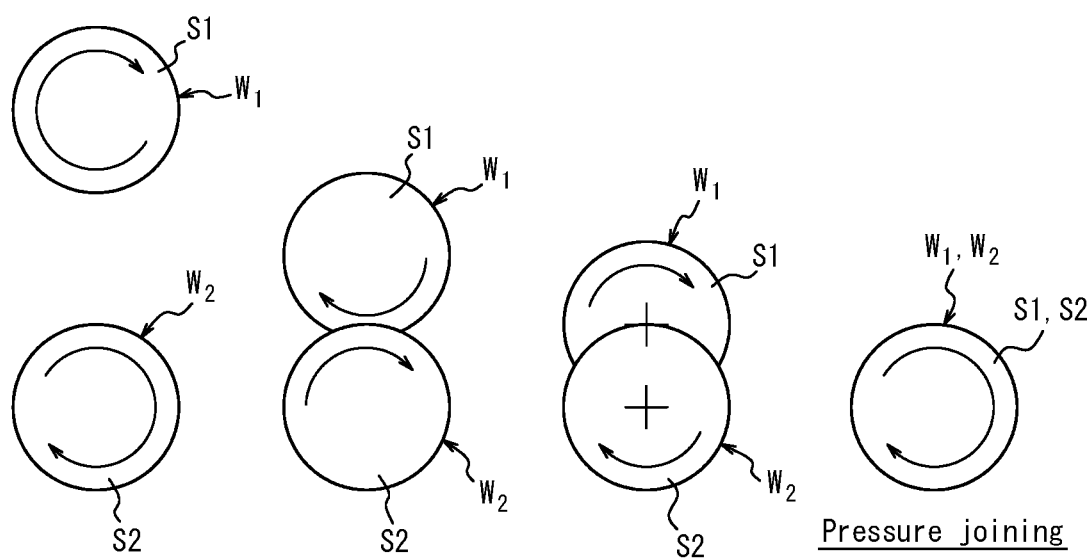
FIGS. 3A to 3D are explanatory views each illustrating the state of a pair of joining surface in the heating step.

In the heating step, as noted above, the first workpiece $W_1$ and the second workpiece $W_2$ are rotating at the same rotation speed in the same direction as seen from one side in the axial direction. Thus, when the spindles are relatively moved from the state in which the surface S1 and the second bonding surface S2 are separated from each other in the X-axis direction, as illustrated in FIG. 3A, and the first joining surface S1 and the second joining surface S2 begin to contact with each other at an outer peripheral edge portion, as illustrated in FIG. 3B, the relative speed difference becomes the maximum and the largest friction heat is generated due to the rotation speed difference, thereby heating the materials with a large temperature rise. The friction heating is continued while maintaining the temperature of the joining surfaces at a level suitable for the joining, until a state is reached where the axes are aligned as illustrated in FIG. 3D.

In the heating step, as illustrated in FIG. 3C, the center portion of the first joining surface S1 contacts with the outer peripheral edge portion of the second joining surface S2 with a rotation speed difference, and the center portion of the second joining surface S2 contacts with the outer peripheral edge portion of the first joining surface S1 with a rotation speed difference. Thus, the central portion of the first joining surface S1 and the central portion of the second joining surface S2 are also heated by friction heat.

When the axes of the first spindle 3a and the second spindle 3b are aligned with each other, as illustrated in FIG. 3D, the relative rotation speed difference between the first spindle 3a and the second spindle 3b in their rotating state becomes zero (0), and the first spindle 3a and the second spindle 3b do not rotate relative to each other, to terminate the heating step.

Figure 4:
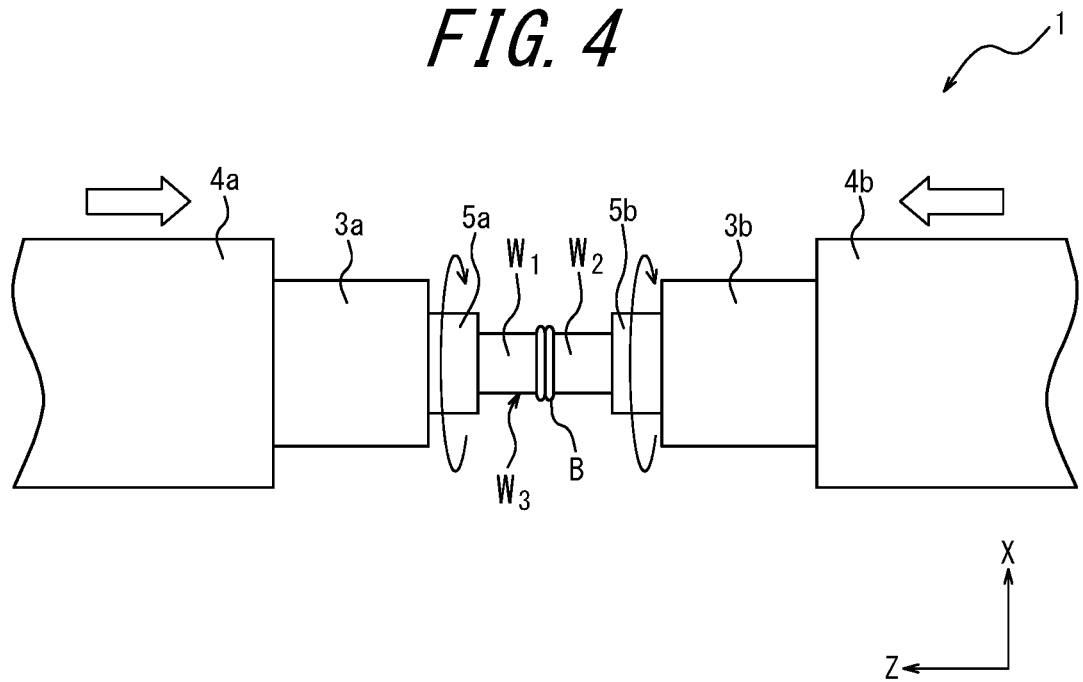
FIG. 4 is explanatory view illustrating the state in which the pressure contacting step is being carried out.

When the axes of the first workpiece $W_1$ and the second workpiece $W_2$ coincide with each other and the heating step is completed, a subsequent pressure joining step of pressing the first workpiece $W_1$ and the second workpiece $W_2$ is carried out. As illustrated in FIG. 4, the pressure joining step is carried out by moving the first workpiece W1 and the second workpiece W2 toward each other in the Z-axis direction, in a state where the axes of the workpieces are aligned and the workpieces are rotated at the same rotation speed in the same direction to stop the relative rotation, and pressing the first joint surface S1 and the second joint surface S2 in the axial direction (Z-axis direction) under a predetermined pressure (upset pressure).

With the pressure joining step after the heating step, the first workpiece $W_1$ and the second workpiece $W_2$, as a pair of materials, are joined by friction welding. By the machine tool 1, the first workpiece $W_1$ and the second workpiece $W_2$ are friction welded to each other, thereby forming a joined workpiece $W_3$. In the present embodiment, the pressure joining step is carried out by moving the first spindle 3a and the second spindle 3b toward each other, based on a moving command to the first spindle 3a and the second spindle 3b for moving the first workpiece $W_1$ and the second workpiece $W_2$ in the directions for urging them against each other.

Since the first spindle 3a and the second spindle 3b are moved in directions toward each other, as compared to the case wherein, with one spindle stopped in the Z-axis direction, the other spindle is moved in the Z-axis direction for urging the first workpiece $W_1$ and the second workpiece $W_2$ against each other, for example, it is possible readily to avoid errors of the control unit C based, for example, on the difference between the positions of the first spindle 3a and the second spindle 3b, and the positions of the movement command.

In the friction welding method according to the present embodiment, as described above, since the outer peripheral edge portion of the second joining surface S2 contacts the center portion of the first joining surface S1, and the first portion contacts the central portion of the second joining surface S2 in the heating step, as compared to the case wherein the first workpiece $W_1$ and the second workpiece $W_2$ are relatively rotated while being maintained in a coaxial state and thereby friction-heated, the central portion of the first joining surface S1 and the central portion of the second joining surface S2 are sufficiently friction-heated. Therefore, in the pressure contacting step, the temperature of the first joining surface S1 and the second joining surface S2 is entirely raised by friction, and the area of the joining surface by friction welding is increased, such that the first workpiece $W_1$ and the second workpiece $W_2$ can be subjected to friction-welding with improved joining strength.

Figure 6:
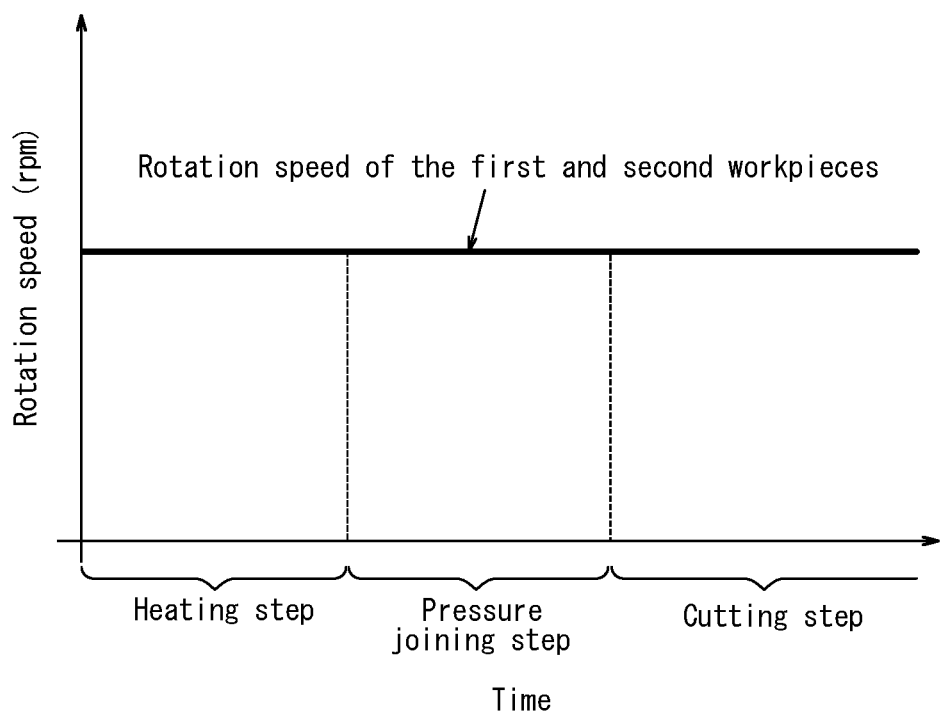
FIG. 6 is a diagram illustrating the rotation speed in each step of a first work and a second work.

As described above, in the friction welding method according to the present embodiment, the first workpiece $W_1$ and the second workpiece $W_2$ are rotated in the same direction at the same rotation speed to perform the heating step. As such, when the heating step is completed with the axes of the first workpiece $W_1$ and the second workpiece $W_2$ aligned with each other, the first joining surface S1 and the second joining surface S2 are relatively stopped. Thus, as illustrated in FIG. 6, after the heating step is completed, it is possible to continuously carry out the above-mentioned pressure joining step without stopping the rotation of the first workpiece $W_1$ and the second workpiece $W_2$, by rotating the first workpiece W1 and the second workpiece W2 in the same rotation as the heating step without stopping the rotation of the first workpiece $W_1$ and the second workpiece $W_2$.

The movement of the first spindle 3a and the second spindle 3b in the X-axis direction for relatively moving the first workpiece $W_1$ in the X-axis direction with respect to the second workpiece $W_2$ is carried out in consideration of the lowering of the temperature due to the decrease in the relative rotation speed difference such that, when the heating step is completed, the temperatures of the first joining surface S1 and the second joining surfaces S2 are maintained as a level required for the friction welding. By controlling the movement of the first spindle 3a and the second spindle 3b, such as the moving speed in the X-axis direction, the friction heating can be continuously and easily carried out while maintaining the temperature at a level suitable for the joining of the first joining surface S1 and the second bonding surface S2, until the axes of the first workpiece W1 and the second workpiece W2 are aligned with each other.

Figure 7:
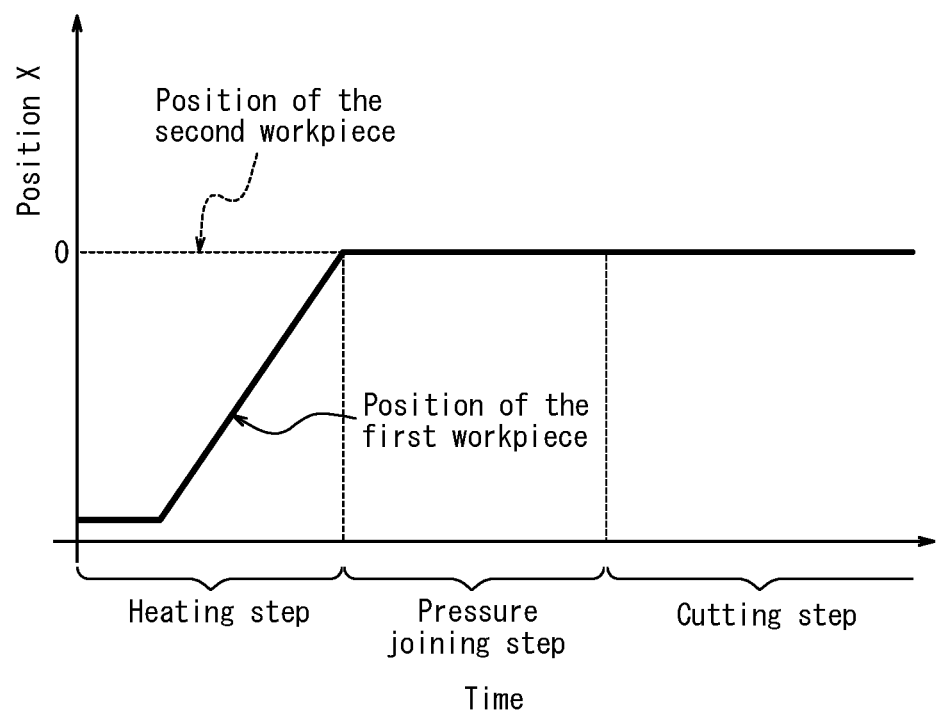
FIG. 7 is a diagram illustrating a position of a first workpiece with respect to a second workpiece in an X-axis direction in each step.

Further, as illustrated in FIG. 7, the heating step is carried out by changing the position X of the first workpiece $W_1$ with respect to the second workpiece $W_2$ in the X-axis direction, and is completed when the axes of the first workpiece $W_1$ and the second workpiece $W_2$ are aligned and the position X becomes zero. When the first workpiece $W_1$ and the second workpiece $W_2$ are joined concentrically, after the heating step is completed, the pressure joining step may be carried out without changing the position X of the first workpiece W1 in the X-axis direction with respect to the second workpiece W2. Therefore, it is possible to shorten the time from the heating step to the starting of the friction welding step, thereby allowing the friction welding to be carried out quickly.

In the friction welding method according to the present embodiment, the cutting step may be carried out continuously after the pressure joining step, while rotating the material as the workpiece W3, in the same direction as in the heating step and the welding step, and at the same rotation speed as seen from one side in the axial direction.

Preferably, the rotation speeds of the first workpiece $W_1$ and the second workpiece $W_2$ in the heating step and the press contacting step are set to a value suitable for allowing appropriate friction heating and carrying out the cutting operation by means of the cutting tool 7.

Figure 5:
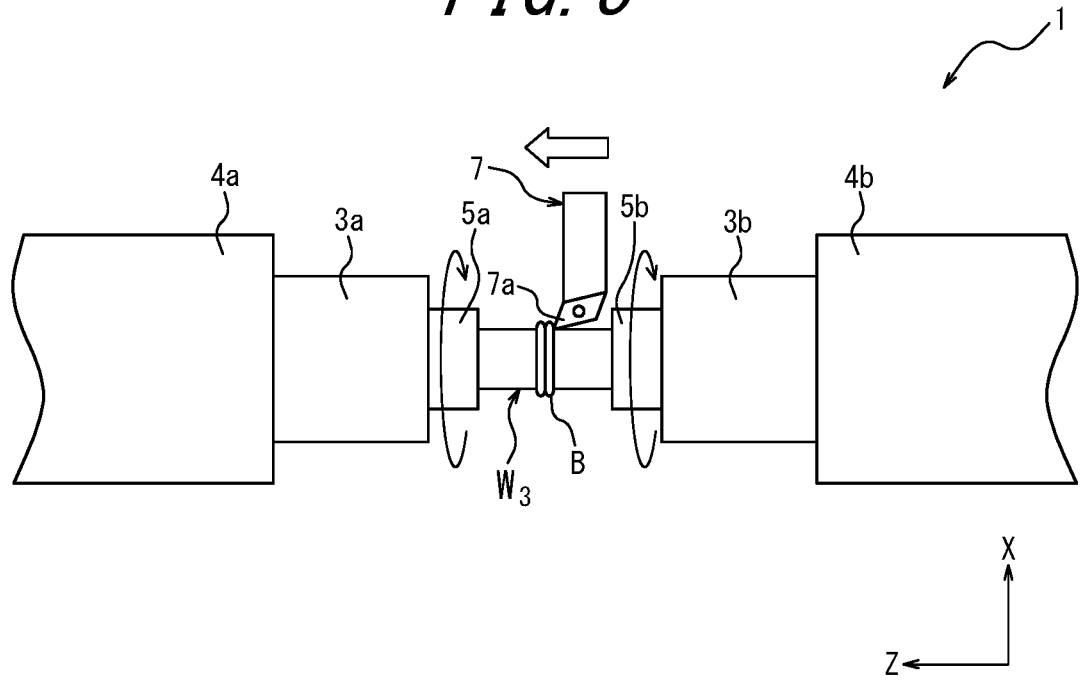
FIG. 5 is explanatory view illustrating the state in which cutting step is being carried out.

At the joined portion of the workpiece $W_3$ in its outer peripheral surface, as illustrated in FIG. 4, a portion softened by the friction heat of the first workpiece $W_1$ and the second workpiece $W_2$ may be pushed radially outward at the time of pressure contacting, thereby forming burrs B. In the cutting step described above, as illustrated in FIG. 5, the moving means 8 may be operated to move the blade portion 7a of the cutting tool 7 in the Z-axis direction, thereby carrying out the cutting step for removing the burrs B.

In the friction welding method according to the present embodiment, as seen from one side in the axial direction, the rotation direction and the rotation speed of the joining workpiece $W_3$ in the cutting step are set to be same as the rotation direction and the rotation speed of the first workpiece $W_1$ and the second workpiece $W_2$ in the heating step and the pressure joining step. Thus, after completion of the pressure joining step, it is possible to continuously carry out the cutting step while maintaining the rotation of the first workpiece $W_1$ and the second workpiece $W_2$ in the same direction and the same rotation speed as in the heating step and the pressure joining step, without adjusting the rotation speeds of the first workpiece $W_1$ and the second workpiece $W_2$. In other words, as illustrated in FIG. 6, all of the heating step, the pressure joining step and the cutting step can be carried out while maintaining the same direction and the same rotation speed of the first workpiece $W_1$ and the second workpiece $W_2$, without stopping the rotation of the first spindle 3a and the second spindle 3b. Therefore, after the first workpiece W1 and the second workpiece W2 are friction welded to each other, it is possible to promptly shift to the cutting step of the joined workpiece W3, thereby shortening the processing time.

As illustrated in FIG. 7, after completion of the friction welding, the cutting step can be continuously carried out without changing the position X of the first workpiece $W_1$ with respect to the second workpiece $W_2$ in the X-axis direction, Further, when it is unnecessary to release the first chuck 5a and the second chuck 5b between the pressure joining step and the cutting step, the processing time can be shortened from this aspect as well. It is necessary to release the first chuck 5a and the second chuck 5b when, after the removal of burrs B of the joined workpiece W3 by means of the cutting step, the joined workpiece $W_3$ is gripped again by the first spindle 3a for the cutting step.

Figure 8A:
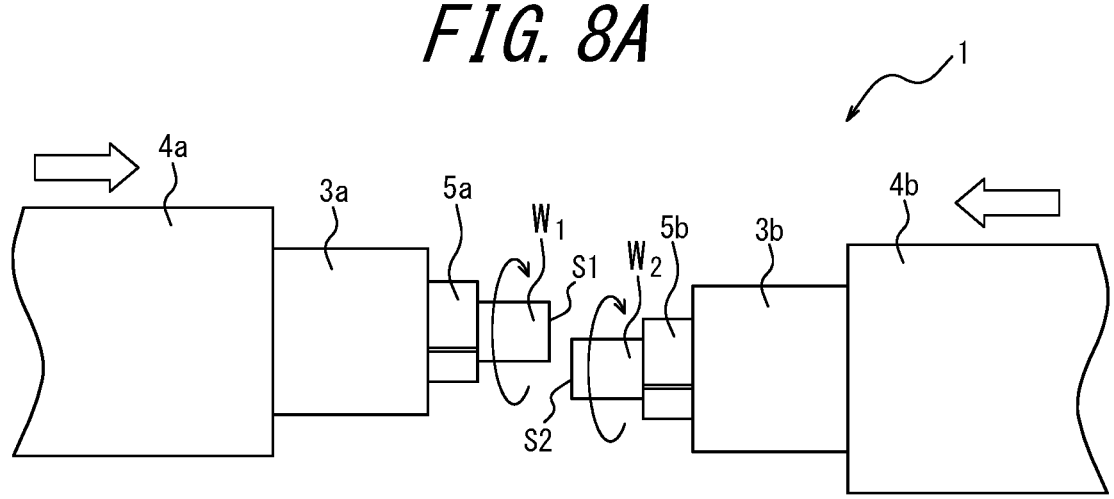
FIGS. 8A and 8B are explanatory views illustrating the state in which the heating step according to a modified embodiment is being carried out.
Figure 8B:
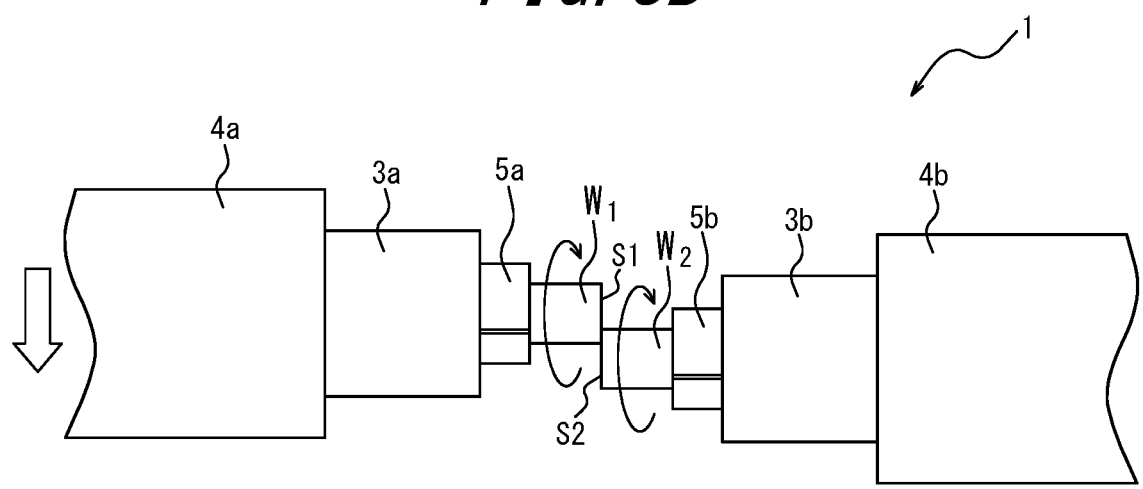
Figure 9A:
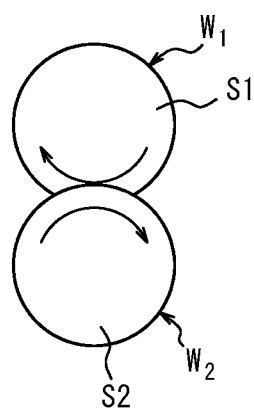
FIGS. 9A to 9C are explanatory views illustrating the state of a pair of joining surface in the heating step according to the modified embodiment.
Figure 9B:
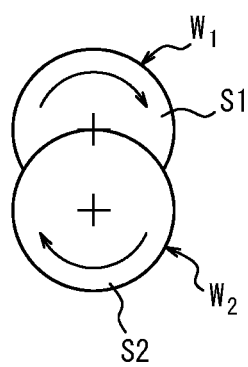
Figure 9C:
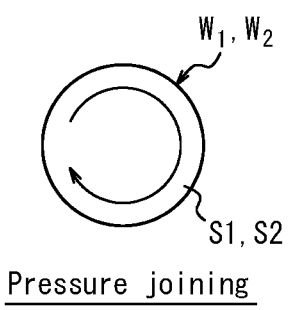

FIGS. 8A and 8B are explanatory views illustrating the procedure of a modification of the heating step, and FIGS. 9A to 9C illustrate the positional relationship and rotation direction of the pair of materials as seen from one side in the axial direction in the heating step of the modification. In FIGS. 8A to 8B and 9A to 9C, members corresponding to those described above are denoted by the same reference numerals.

In the embodiment described above, as illustrated in FIG. 2A, the first workpiece $W_1$ and the second workpiece $W_2$ are arranged such that the first joining surface S1 and the second joining surface S2 are situated at the Z-axis position, with the respective axes unaligned with each other in the X-axis direction, thereby separating the first workpiece $W_1$ from the second workpiece $W_2$ in the X-axis direction, and the heating step is then started by relatively moving the first joint surface S1 and the second joint surface S2 into contact with each other in the X-axis direction.

In contrast, as illustrated in FIG. 8A, the first workpiece $W_1$ and the second workpiece $W_2$ are arranged such that the first joining surface S1 and the second joining surface S2 are arranged opposite to each other only at a part of the outer peripheral edge side, and spaced apart in the Z-axis direction with their axes shifted from each other in the X-axis direction, and the first workpiece $W_1$ and the second workpiece $W_2$ are then relatively moved in the Z-axis direction toward each other. By this, as illustrated in FIG. 8B, the outer peripheral side portion of the first joining surface S1 and the outer peripheral side portion of the second joining surface S2 can be brought into contact with each other, for starting the heating step. In this case, the first joining surface S1 and the second joining surface S2 can be reliably brought into contact under a predetermined pressing force with a simple control.

In the above-described modified example also, the first joining surface S1 and the second joining surface S2 start to contact each other at the outer peripheral portion, as illustrated in FIG. 9A, the central portion of the first joining surface S1 and the central portion of the second joining surface S2 are heated by friction heat, as illustrated in FIG. 9B, and the friction heating is continuously carried out while maintaining the surface temperature suitable for carrying out joining until the axes are aligned, as illustrated in FIG. 9C.

The present disclosure is not limited to the above-described embodiments, and various modifications may be made without departing from the scope thereof.

For example, the friction welding method according to the present embodiment is not limited to use of the machine tool 1 illustrated in FIG. 1, and may make use of another machine tool or the like, as long as a pair of arranged opposite to the spindles is included. In addition, the second workpiece $W_2$ may be gripped and friction welded by a spindle distinct from the second spindle 3b and provided to face the first spindle 3a. In this case, it is preferred that the spindle for griping the second workpiece $W_2$ distinct from the second main spindle 3b is provided on the second headstock 4b together with the second spindle 3b. The second spindle 3b may be used for cutting, separately from the friction welding. The cutting step carried out separately from the friction welding on the second spindle 3b may be replaced by a cutting step carried out simultaneously with the friction welding by using a spindle distinct from the second spindle 3b.

In the embodiment described above, for the purpose of bringing the first joint surface S1 and the second joint surface S2 into contact with each other in the outer peripheral edge portion, and aligning the axes with each other, an example has been presented wherein the first spindle 3a is moved. Alternatively, the second spindle 3b may be moved, or both spindles may be relatively moved.

In the embodiment described above, an example has been presented wherein the axis of movement of the machine tool from a position in which the first joint surface S1 and the second joint surface S2 are brought into contact with each other at the outer peripheral edge portion, to a position in which the axes are aligned with each other, is the X axis. However, if the machine tool can be driven to move in the Y-axis direction, the friction welding method according to the present disclosure may also be carried out by moving the machine tool in the Y-axis direction.

In addition to maintaining the moving speed of the X-axis constant from a position in which the first joining surface S1 and the second joining surface S2 are brought into contact with each other at the outer peripheral edge portion, to a position in which the axes are aligned with each other, it is also possible to control the moving speed when aligning the axes, such that the moving speed is increased sequentially or stepwise toward the axis, as compared to the outer peripheral edge portion. By controlling the moving speed in the heating step, it is possible to precisely control the temperature of the joining surfaces.

In the embodiment described above, the first workpiece $W_1$ and the second workpiece $W_2$ has been presented as comprising metal bars of circular cross-section, with the first joint surface S1 and the second joint surface S2 each facing in the axial direction and comprising a flat surface perpendicular to the axial direction. However, provided that the first joint surface S1 and the second joint surface S2 facing in the axial direction are flat surfaces perpendicular to the axial direction, respectively, there may be used other materials, different outer diameters and shapes, such as a polygonal column.

In the embodiment described above, an example has been presented wherein the cutting step is continuously performed after the friction welding, while rotating the first workpiece $W_1$ and the second workpiece $W_2$ at the same rotation speed in the same rotation direction as in the heating step and the pressure contacting step. However, the cutting step may be carried out after the friction welding with the rotation speed of the first workpiece $W_1$ and the second workpiece $W_2$ controlled to be the rotation speed suitable for the friction welding, and subsequently change of the rotation speed of the first workpiece $W_1$ and the second workpiece $W_2$ to a level suitable for the cutting step. In this case also, the heating step, the pressure joining step and the cutting step can be performed without stopping the rotation of the first workpiece $W_1$ and the second workpiece W2, to thereby reduce the processing time.

In the embodiment described above, the pressure joining step has been presented as being carried out with the axes of the first workpiece $W_1$ and the second workpiece $W_2$ aligned with each other. However, the pressure joining step may be carried out at a position where the axes of the first workpiece $W_1$ and the second workpiece $W_2$ are unaligned with each other.

REFERENCE SIGNS LIST

1 Machine tool
2 Base
3a First spindle
3b Second Spindle
4a First headstock
4b Second headstock
5a First chuck
5b Second chuck
6a First driving source
6b Second driving source
7 Tool
7a Blade portion
8 Moving means
9a First Z-axis guide rail
9b Second Z-axis guide rail
10a First saddle
10b Second saddle
11a First X-axis guide rail
11b Second X-axis guide rail
$W_1$ First workpiece (material)
$W_2$ Second workpiece (material)
$W_3$ Joined workpiece (material)
C Control unit
S1 First joining surface
S2 Second joining surface
B Burr

The invention claimed is:

1. A machine tool, comprising:
a pair of spindles arranged opposite to each other; and
a control unit configured to control movement and rotation of the spindles for carrying out a heating step wherein, in relation to joining surfaces defined by opposite end surfaces of a pair of materials that are held by a respective pair of opposite spindles, the pair of materials are moved from a state in which their axes are unaligned with each other, in a direction for aligning the respective axes with each other, to a prescribed position where the joining surfaces are brought into contact with each other and friction heated; and a pressure contacting step wherein the pair of materials are brought into pressure contact with each other at the prescribed position, characterized in that,
the heating step and the pressure contacting step are carried out while the control unit controls the rotation of the spindles at the same rotation speed in the same direction, as seen from one side in the axial direction, and further controls the movement and rotation of the spindles to maintain a temperature of each of the joining surfaces suitable for friction welding, and
the control unit is configured to control a moving speed of one material of the pair of materials with respect to another material of the pair of materials such that the moving speed is increased sequentially or stepwise toward the respective axes as compared to respective outer peripheral portions of the pair of materials when aligning the axes in the heating step.

2. The machine tool according to claim 1, wherein the control unit controls the movement of the spindles to align the axes of the pair of materials with each other where the pressure contacting step is carried out.

3. The machine tool according to claim 1, wherein the control unit controls movement of the tool to carry out a cutting step after the pressure joining step, for cutting the materials by the tool while the control unit controls the rotation of the spindles are rotated at the same rotation speed and in the same direction as in the heating step and the pressure contacting step, as seen from one side in the axial direction.

4. The machine tool according to claim 2, wherein the control unit controls movement of the tool to carry out a cutting step after the pressure joining step, for cutting the materials by the tool while the control unit controls the rotation of the spindles are rotated at the same rotation speed and in the same direction as in the heating step and the pressure contacting step, as seen from one side in the axial direction.

5. A friction welding method executed by the machine tool according to claim 1, comprising: a heating step wherein, in relation to joining surfaces defined by opposite end surfaces of a pair of materials that are held by a respective pair of opposite spindles, the pair of materials are moved from a state in which theft axes are unaligned with each other, in a direction for aligning the respective axes with each other, to a prescribed position where the joining surfaces are brought into contact with each other and friction heated, and a pressure contacting step wherein the pair of materials are brought into pressure contact with each other at the prescribed position, characterized in that the heating step and the pressure contacting step are carried out while rotating each of the materials at the same rotation speed in the same direction, as seen from one side in the axial direction, and wherein each of the joining surfaces is maintained at a temperature suitable for joining the joining surfaces in the heating step, and wherein a moving speed of one material of the pair of materials with respect to another material of the pair of materials is increased sequentially or stepwise toward the respective axes as compared to respective outer peripheral portions of the pair of materials when aligning the axes in the heating step.

6. The friction welding method according to claim 5, wherein the pressure contacting step is carried out at a position where the axes of the pair of the materials are aligned with each other.

7. The friction welding method according to claim 5, further comprising a cutting step carried out after the pressure joining step, for cutting the materials while being rotated at the same rotation speed and in the same direction as in the heating step and the pressure contacting step, as seen from one side in the axial direction.

8. The friction welding method according to claim 6, further comprising a cutting step carried out after the pressure joining step, for cutting the materials while being rotated at the same rotation speed and in the same direction as in the heating step and the pressure contacting step, as seen from one side in the axial direction.

* * * * *